Patented Apr. 7, 1942

2,278,498

UNITED STATES PATENT OFFICE 2,278,498

REMOVAL OF SULPHUR FROM ORGANIC SUBSTANCES

Bernard H. Shoemaker, Hammond, Ind., assignor to Standard Oil Company, Chicago, Ill., a corporation of Indiana No Drawing. Application February 16, 1939, Serial No. 256,722

12 Claims. (Cl. 196—30)

This invention relates to the removal of sulphur, oxygen and/or peroxides from materials containing one or more of them and more particularly to the removal of sulphur, oxygen and/or peroxides from petroleum products, oxidized organic materials and the like.

The present invention, while particularly adapted for the removal of sulphur from petroleum products, such as naphthas, motor fuels, kerosene, cleaning naphthas, lubricating oils, transformer oils, white oils, insulating oils, waxes and other petroleum products, is also applicable to the removal of sulphur from sulphur contaminated equipment as well as the removal of sulphur from the surface of rubber materials.

In practicing my invention, I treat the material from which it is desired to remove free sulphur, oxygen, or peroxides with a hydrocarbon substituted ammonium sulphur compound which is capable of forming a hydrocarbon substituted ammonium thiosulphate when reacted with one of the constituents to be removed. Thus, for the removal of free sulphur, I employ a hydrocarbon substituted ammonium sulphite, and particularly a neutral hydrocarbon substituted ammonium sulphite. The hydrocarbon substituted ammonium sulphite may be prepared extraneously or it may be formed in situ by adding an amine in excess amounts to the material to be treated and then slowly introducing therein an excess or sulphur dioxide. The mechanism for the complete reactions involved in the formation of the hydrocarbon substituted ammonium sulphite and the removal of sulphur may be illustrated by the following equations, using in the example a tertiary amine:

(1) $2R_3N + SO_2 + H_2O \rightarrow (R_3NH)_2SO_3$
(2) $(R_3NH)_2SO_3 + S \rightarrow (R_3NH)_2S_2O_3$ in which "R" represents a hydrocarbon radical, particularly an aliphatic radical, either saturated or unsaturated, or a cycloaliphatic radical. By way of example, the following amines may be used:

Monoethylamine
Diethylamine
Triethylamine
Monopropylamine
Dipropylamine
N-monobutylamine
N-dibutylamine
N-tributylamine
Diethylene triamine
Triethylene tetramine
Piperidine
Monoamylamine
Diamylamine
Triisoamylamine
Cyclohexylamine
Dicyclohexylamine and others. In general, it may be stated that amines having ionization constants greater than $6.5 \times 10^{-5}$ are effective, whereas, amines having ionization constants less than this value are less effective.

In order to facilitate the recovery of the amine from the final reaction product, namely, the thiosulphate, it is preferable to employ amines which are water insoluble.

To recover the amines from the thiosulphates, the latter is treated with caustic, thereby liberating the amine and forming sodium thiosulphate. The mechanism for this reaction may be represented by the following equation:

(3) 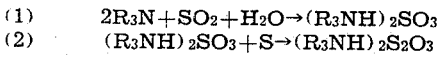
$$2R_3N + 2H_2O + Na_2S_2O_3$$

in which "R" represents, as aforementioned, an aliphatic or cycloaliphatic radical. Since the amine employed in the reaction is ultimately recovered and recycled, the only chemicals consumed in the process are sulphur dioxide and sodium hydroxide.

As an example of the present invention, to about 50 volumes of sulphur containing naphtha, there were added about 3 volumes of triamylamine and an equal volume of water and the mixture saturated with gaseous sulphur dioxide. After settling, the aqueous layer was separated from the naphtha and the latter then washed several times with water. The treated naphtha, when tested with sodium plumbite and mercaptans, formed no lead sulphite, indicating that the treated naphtha contained no free sulphur. An untreated sample of the same sulphur-saturated naphtha gave a heavy precipitate of lead sulphide when tested with sodium plumbite and mercaptans.

While I have described my invention as applied to the removal of sulphur from sulphur containing materials, this is not the only application of the invention. As aforementioned, the invention is equally suited for the removal of oxygen and/or peroxides from materials containing the same. Thus, an important application of the invention is the removal of peroxides from organic bodies containing the same, such as oxidized petroleum products, oxidized animal and vegetable fats and fatty oils, oxidized ethers, oxidized ketones, oxidized rubber and other organic materials. Further, the presence of traces or organic peroxides in motor fuels lowers the octane number of the fuel, and influences chemical reactions, such as the chlorination of hydrocarbons. It is, therefore, highly desirable to have an effective method of removing such organic peroxides.

The invention may be applied also to the removal of oxygen from closed systems in which the presence of oxygen is detrimental to the operation of such systems, such as the removal of oxygen from sealed refrigeration systems in which the presence of oxygen causes deterioration and oxidation of the lubricant. The invention may also be used to remove oxygen in systems such as closed electrical transformers where the presence of oxygen results in the oxidation of the insulating oil. The invention is applicable to the removal of oxygen from reactions such as the thermal treatment and polymerization of organic compounds.

As in the case of the removal of sulphur from materials containing the same, the oxygen and/or peroxides are removed by treating the material containing them with a hydrocarbon substituted ammonium sulphur compound which is capable of forming a hydrocarbon substituted ammonium thiosulphate when reacted with oxygen and/or peroxides. Whereas in the removal of free sulphur a hydrocarbon substituted ammonium sulphite is employed, for the removal of oxygen and/or peroxides, I employ a hydrocarbon substituted ammonium sulphide, since the reaction of the hydrocarbon substituted ammonium sulphide with oxygen and/or peroxides forms the desired substituted ammonium thiosulphate. The hydrocarbon ammonium substituted sulphide may be used as such or it may be formed in situ by adding an amine to the material to be treated and subsequently introducing thereinto hydrogen sulphide. The mechanism for the complete reactions involved in the removal of oxygen and/or peroxides from material containing the same, may be represented by the following equations, using in the example a tertiary amine:

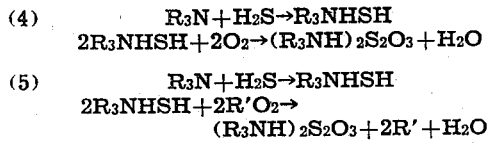

in which "R" represents an aliphatic or cycloaliphatic amine as heretofore defined and "$R'O_2$" represents an organic peroxide. As hereinbefore stated, the hydrocarbon ammonium substituted thiosulphate may be decomposed with caustic for the recovery of the amine.

As an example, the invention in removing peroxides from organic bodies, 50 volumes of a U. S. P. white oil, which had been in storage for several years and which contained a large amount of peroxide, were treated with about 3 volumes of triamylamine and an equal amount of water. This mixture was then blown with nitrogen to remove the oxygen present and thereafter hydrogen sulphide was slowly added. After settling the aqueous layer was separated and the oil layer washed several times with water, after which the oil was tested with a peroxide test solution which is a mixture of ferrous sulphate and ammonium thiocyanate ($FeSO_4$ and $NH_4SCN$). When so tested, the oil gave a negative test for peroxides while the untreated oil gave a deep red color indicating the presence of peroxides.

While I have described my invention in connection with several specific examples thereof, it is to be understood that the invention is not limited thereby but that numerous modifications within the scope of the appended claims will occur to those skilled in the art in the light of my disclosure of my invention.

I claim:

1. The method of removing sulphur from a material containing the same, comprising treating said material with an ammonium sulphur compound in which at least one of the hydrogen atoms has been substituted by a hydrocarbon radical, said ammonium sulphur compound being capable of forming a hydrocarbon substituted ammonium thiosulphate when reacted with said sulphur, and subsequently separating and removing the hydrocarbon substituted ammonium thiosulphate so formed.

2. The method of removing sulphur from a material containing the same, comprising treating said material with an ammonium sulphite in which at least one of the hydrogen atoms has been substituted by a hydrocarbon radical, said ammonium sulphite being capable of forming a hydrocarbon substituted ammonium thiosulphate when reacted with said sulphur, and subsequently separating and removing the hydrocarbon substituted thiosulphate so formed.

3. The method as described in claim 2 in which at least one of the hydrogen atoms of the ammonium sulphite has been substituted by an aliphatic radical.

4. The method as described in claim 2 in which at least one of the hydrogen atoms of the ammonium sulphite has been substituted by a butyl radical.

5. The method as described in claim 2 in which two of the hydrogen atoms of the ammonium sulphite are substituted by amyl radicals.

6. The method as described in claim 2 in which at least one of the hydrogen atoms of the ammonium sulphite has been substituted by an amyl radical.

7. The method of removing sulphur from a petroleum product comprising treating said petroleum product with a hydrocarbon substituted ammonium sulphite, which reacts with the sulphur to form a hydrocarbon substituted ammonium thiosulphate and subsequently separating and removing the hydrocarbon substituted ammonium thiosulphate so formed.

8. The method described in claim 7 in which the hydrocarbon substituted ammonium sulphite is an alkyl substituted ammonium sulphite.

9. The method of preparing a petroleum product substantially free of uncombined sulphur, comprising adding an alkyl substituted ammonium sulphite to said petroleum product, reacting said sulphite with said sulphur to form an alkyl substituted ammonium thiosulphate and removing the same from the petroleum product.

10. The method of preparing a petroleum product containing substantially no free sulphur, comprising adding an aliphatic amine to the petroleum product containing free sulphur, slowly adding sulphur dioxide to the mixture to form a neutral aliphatic substituted ammonium sulphite, and subsequently removing from the petroleum product the aliphatic substituted ammonium thiosulphate formed by the reaction of sulphur with the sulphite resulting from the reaction of the aliphatic amine with sulphur dioxide.

11. The method described in claim 10 in which the aliphatic amine has an ionization constant greater than $6.5 \times 10^{-5}$.

12. The method of preparing a petroleum product containing substantially no free sulphur, comprising adding an aliphatic amine to the petroleum product containing free sulphur, slowly adding sulphur dioxide to the mixture to form a neutral aliphatic hydrocarbon substituted ammonium sulphite, permitting said neutral aliphatic hydrocarbon substituted ammonium sulphite to react with said free sulphur to form an aliphatic hydrocarbon substituted ammonium thiosulphate, removing the sulphur-free petroleum product from the aliphatic hydrocarbon substituted ammonium thiosulphate, and treating the latter with caustic to recover therefrom the aliphatic amine.

BERNARD H. SHOEMAKER.